United States Patent
Li

(10) Patent No.: US 11,249,360 B2
(45) Date of Patent: Feb. 15, 2022

(54) ARRAY SUBSTRATE AND DISPLAY DEVICE WITH ENHANCED PIXEL UNIT CHARGING EFFICIENCY

(71) Applicants: HKC CORPORATION LIMITED, Shenzhen (CN); CHONGQING HKC OPTOELECTRONICS TECHNOLOGY CO., LTD., Chongqing (CN)

(72) Inventor: Wenxin Li, Chongqing (CN)

(73) Assignees: HKC CORPORATION LIMITED, Shenzhen Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 469 days.

(21) Appl. No.: 16/331,875

(22) PCT Filed: Nov. 7, 2018

(86) PCT No.: PCT/CN2018/114372
§ 371 (c)(1),
(2) Date: Mar. 8, 2019

(87) PCT Pub. No.: WO2019/161682
PCT Pub. Date: Aug. 29, 2019

(65) Prior Publication Data
US 2021/0325744 A1 Oct. 21, 2021

(30) Foreign Application Priority Data
Feb. 24, 2018 (CN) .......................... 201810157156.9

(51) Int. Cl.
*G02F 1/1362* (2006.01)
*G02F 1/1368* (2006.01)
*G09G 3/36* (2006.01)

(52) U.S. Cl.
CPC ...... *G02F 1/136286* (2013.01); *G02F 1/1368* (2013.01); *G09G 3/3648* (2013.01);
(Continued)

(58) Field of Classification Search
CPC ............ G02F 1/136286; G02F 1/1368; G09G 3/3677; G09G 3/3688; G09G 2300/0809; G09G 2310/08
See application file for complete search history.

(56) References Cited

U.S. PATENT DOCUMENTS

2011/0075062 A1* 3/2011 He ...................... G09G 3/3614 349/42
2017/0004794 A1* 1/2017 Huang ................ G09G 3/3648

FOREIGN PATENT DOCUMENTS

CN 101995708 A 3/2011
CN 104977763 A 10/2015
(Continued)

OTHER PUBLICATIONS

International Search Report from International Application No. PCT/CN2018/114372 dated Jan. 16, 2019.

*Primary Examiner* — Kwang-Su Yang
(74) *Attorney, Agent, or Firm* — Hauptman Ham, LLP

(57) ABSTRACT

The present disclosure provides an array substrate and a display device. The array substrate includes a plurality of pixel units arranged in a matrix form. When one row of pixel units is charged through a second scanning line, a next row of pixel units is pre-charged through a first scanning line, so as to improve the charging efficiency of the pixel units.

19 Claims, 4 Drawing Sheets

(52) U.S. Cl.
CPC ......... *G09G 3/3677* (2013.01); *G09G 3/3688* (2013.01); *G09G 2300/0809* (2013.01); *G09G 2310/08* (2013.01)

(56) References Cited

FOREIGN PATENT DOCUMENTS

| | | |
|---|---|---|
| CN | 108279539 A | 7/2018 |
| JP | 2004233386 A | 8/2004 |

\* cited by examiner

ARRAY SUBSTRATE AND DISPLAY DEVICE WITH ENHANCED PIXEL UNIT CHARGING EFFICIENCY

TECHNICAL FIELD

The present disclosure relates to the technical field of liquid crystal displays, and in particular, relates to an array substrate and a display device.

BACKGROUND

Thin film transistor liquid crystal display (TFT-LCD) is one of main current flat panel displays and has become an important display platform in modern IT and visual products. The main driving principle of the TFT-LCD is substantially described as follows. A motherboard of a system inputs an R/G/B compression signal and a gate drive signal into a printed circuit board (PCB) through wires, after being processed by a timing controller (TCON, for generating a clock signal) on the PCB, data is connected to a data line and a scanning line in a display region respectively by a Source-Chip on Film (S-COF) connecting the data line and a Gate-Chip on Film (G-COF) connecting the scanning line through the PCB. The G-COF receives a clock signal, the PCB outputs a digital signal every one rising edge of a clock, each signal is corresponding to an output of a gate signal, a digital signal at a high or low level is converted to an analog signal with a required high or low voltage through digital-to-analog conversion, switches of pixel units of a panel are turned on line by line, and the R/G/B compression signal charges a pixel electrode through the data line.

To satisfy market demands, resolution and a refresh frequency of a display panel become higher, and a pixel unit has less time to be charged. For example, in a 120 Hz UD (3840P×2160P) product, the charging time of the pixel unit is 1/120/2160≈3.85 microseconds. The pixel unit has less time to be charged, with a result that a charging rate of the pixel unit becomes lower, and display effects of the display panel are seriously influenced.

SUMMARY

The present disclosure provides an array substrate and a display device, and when one row of pixel units is charged, a next row of pixel units is pre-charged, thereby enhancing charging efficiency of pixel units.

In an aspect, an embodiment of the present disclosure provides an array substrate including:

a substrate;

a plurality of pixel units, arranged on the substrate, wherein the plurality of pixel units is defined by a plurality of scanning lines and a plurality of data lines perpendicular to each other and is arranged in a matrix, the plurality of scanning lines comprises a plurality of first scanning lines and a plurality of second scanning lines, one first scanning line and one second scanning line are correspondingly arranged for each row of pixel units, one data line is arranged for each column of pixel units, and each of the pixel units is located between the corresponding first scanning line and the corresponding second scanning line;

a plurality of first active switches, wherein each of the first active switches corresponds to one pixel unit, a control end of the first active switch is connected to the corresponding first scanning line, and a first connecting end of the first active switch is connected to the corresponding data line;

a plurality of second active switches, wherein each of the pixel units in the second row to the last row corresponds to one second active switch, a control end of the second active switch is connected to the corresponding second scanning line, and a first connecting end of the second active switch is connected to the corresponding data line; and a plurality of control switches, wherein the second scanning line corresponding to each row of pixel units is connected to the first connecting end of one control switch, a second connecting end of the control switch is connected to the first scanning line corresponding to a next row of pixel units, the first connecting ends of the plurality of control switches are configured to be commonly connected to a scan drive circuit controlled by a timing control circuit, and the control ends of the plurality of control switches are configured to be commonly connected to the timing control circuit that outputs a clock signal.

In an embodiment, each of the pixel units further comprises a pixel electrode;

a second connecting end of each of the first active switches is connected to the corresponding pixel electrode; and a second connecting end of each of the second active switches is connected to the corresponding pixel electrode.

In an embodiment, the first active switches are thin film transistors, the control ends of the first active switches are gates, the first connecting ends of the first active switches are sources, and the second connecting ends of the first active switches are drains.

In an embodiment, the second active switches are thin film transistors, the control ends of the second active switches are gates, the first connecting ends of the second active switches are sources, and the second connecting ends of the second active switches are drains.

In an embodiment, the control switches are N-channel thin film transistors, the control ends of the control switches are gates, the first connecting ends of the control switches are sources, and the second connecting ends of the control switches are drains.

In another aspect, an embodiment of the present invention further provides a display device including:

a display panel;

a scan drive circuit, configured to drive first scanning lines and second scanning lines of the display panel;

a data drive circuit, configured to drive data lines of the display panel; and a timing control circuit, configured to output a clock signal and control operations of the scan drive circuit and the data drive circuit and ON and OFF of the control switches;

wherein the display panel comprises an array substrate and the array substrate comprises:

a substrate;

a plurality of pixel units, arranged on the substrate, wherein the plurality of pixel units is defined by a plurality of scanning lines and a plurality of data lines perpendicular to each other and is arranged in a matrix, the plurality of scanning lines comprises a plurality of first scanning lines and a plurality of second scanning lines, one first scanning line and one second scanning line are correspondingly arranged for each row of pixel units, one data line is arranged for each column of pixel units, and each of the pixel units is located between the corresponding first scanning line and the corresponding second scanning line;

a plurality of first active switches, wherein each of the first active switches corresponds to one pixel unit, a control end of the first active switch is connected to the corresponding first scanning line, and a first connecting end of the first active switch is connected to the corresponding data line;

a plurality of second active switches, wherein each of the pixel units in the second row to the last row corresponds to one second active switch, a control end of the second active switch is connected to the corresponding second scanning line, and a first connecting end of the second active switch is connected to the corresponding data line; and a plurality of control switches, wherein the second scanning line corresponding to each row of pixel units is connected to the first connecting end of one control switch, a second connecting end of the control switch is connected to the first scanning line corresponding to a next row of pixel units, the first connecting ends of the plurality of control switches are configured to be commonly connected to the scan drive circuit controlled by the timing control circuit, and the control ends of the plurality of control switches are configured to be commonly connected to the timing control circuit that outputs a clock signal.

In an embodiment, each of the pixel units further comprises a pixel electrode;

a second connecting end of each of the first active switches is connected to the corresponding pixel electrode; and a second connecting end of each of the second active switches is connected to the corresponding pixel electrode.

In an embodiment, the first active switches are thin film transistors, the control ends of the first active switches are gates, the first connecting ends of the first active switches are sources, and the second connecting ends of the first active switches are drains.

In an embodiment, the second active switches are thin film transistors, the control ends of the second active switches are gates, the first connecting ends of the second active switches are sources, and the second connecting ends of the second active switches are drains.

In an embodiment, the control switches are N-channel thin film transistors, the control ends of the control switches are gates, the first connecting ends of the control switches are sources, and the second connecting ends of the control switches are drains.

In an embodiment, the control switches are arranged in a fanout area of the display panel.

In yet another aspect, an embodiment of the present invention further provides another display device, comprising:

a display panel;

a scan drive circuit, configured to drive first scanning lines and second scanning lines of the display panel;

a data drive circuit, configured to drive data lines of the display panel;

a timing control circuit, configured to output a clock signal and control operations of the scan drive circuit and the data drive circuit and ON and OFF of the control switches;

a backlight module, configured to provide a light source for the display panel;

a housing, configured to package and fix the display panel, the backlight module, and the drive circuit; and a base, configured to make the display device be stably placed on a horizontal plane;

wherein the display panel comprises an array substrate and the array substrate comprises:

a substrate;

a plurality of pixel units, arranged on the substrate, wherein the plurality of pixel units is defined by a plurality of scanning lines and a plurality of data lines perpendicular to each other and is arranged in a matrix, the plurality of scanning lines comprises a plurality of first scanning lines and a plurality of second scanning lines, one first scanning line and one second scanning line are correspondingly arranged for each row of pixel units, one data line is arranged for each column of pixel units, and each of the pixel units is located between the corresponding first scanning line and the corresponding second scanning line;

a plurality of first active switches, wherein each of the first active switches corresponds to one pixel unit, a control end of the first active switch is connected to the corresponding first scanning line, and a first connecting end of the first active switch is connected to the corresponding data line;

a plurality of second active switches, wherein each of the pixel units in the second row to the last row corresponds to one second active switch, a control end of the second active switch is connected to the corresponding second scanning line, and a first connecting end of the second active switch is connected to the corresponding data line; and a plurality of control switches, wherein the second scanning line corresponding to each row of pixel units is connected to the first connecting end of one control switch, a second connecting end of the control switch is connected to the first scanning line corresponding to a next row of pixel units, the first connecting ends of the plurality of control switches are configured to be commonly connected to a scan drive circuit controlled by a timing control circuit, and the control ends of the plurality of control switches are configured to be commonly connected to the timing control circuit that outputs a clock signal.

In an embodiment, the display device further comprises a housing, configured to package and fix the display panel, the background module, the scan drive circuit, and the data drive circuit.

In an embodiment, the display device further comprises a base, configured to make the display device be placed on a horizontal plane stably.

In an embodiment, each of the pixel units further comprises a pixel electrode;

a second connecting end of each of the first active switches is connected to the corresponding pixel electrode; and a second connecting end of each of the second active switches is connected to the corresponding pixel electrode.

In an embodiment, the first active switches are thin film transistors, the control ends of the first active switches are gates, the first connecting ends of the first active switches are sources, and the second connecting ends of the first active switches are drains.

In an embodiment, the second active switches are thin film transistors, the control ends of the second active switches are gates, the first connecting ends of the second active switches are sources, and the second connecting ends of the second active switches are drains.

In an embodiment, the control switches are N-channel thin film transistors, the control ends of the control switches are gates, the first connecting ends of the control switches are sources, and the second connecting ends of the control switches are drains.

In an embodiment, the control switches are arranged in a fanout area of the display panel.

For the array substrate and the display device in the embodiments of the present disclosure, one first scanning line and one second scanning line are correspondingly arranged for each row of pixel units, the first scanning lines are configured to be pre-charged, the second scanning lines are configured to be charged, the second scanning lines corresponding to each row of pixel units is all connected to the control switches corresponding to a next row of pixel units, the control switches are controlled by a clock signal at the same time, during a rising edge of a clock signal, a drive signal is input to the second scanning lines of one row of pixel units, so that the row of pixel units is charged, when the clock signal becomes at a low level, the control switches controlled by the clock signal and connected to the first scanning lines of the next row of pixel units are turned on, and the drive signal is input to the first scanning lines of the next row of pixel units through the corresponding control switches, so that the next row of pixel units is pre-charged, so as to achieve an objective that a next row of pixel units are pre-charged while one row of pixel units is charged.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

LIST OF REFERENCE NUMERALS

Figure 1:
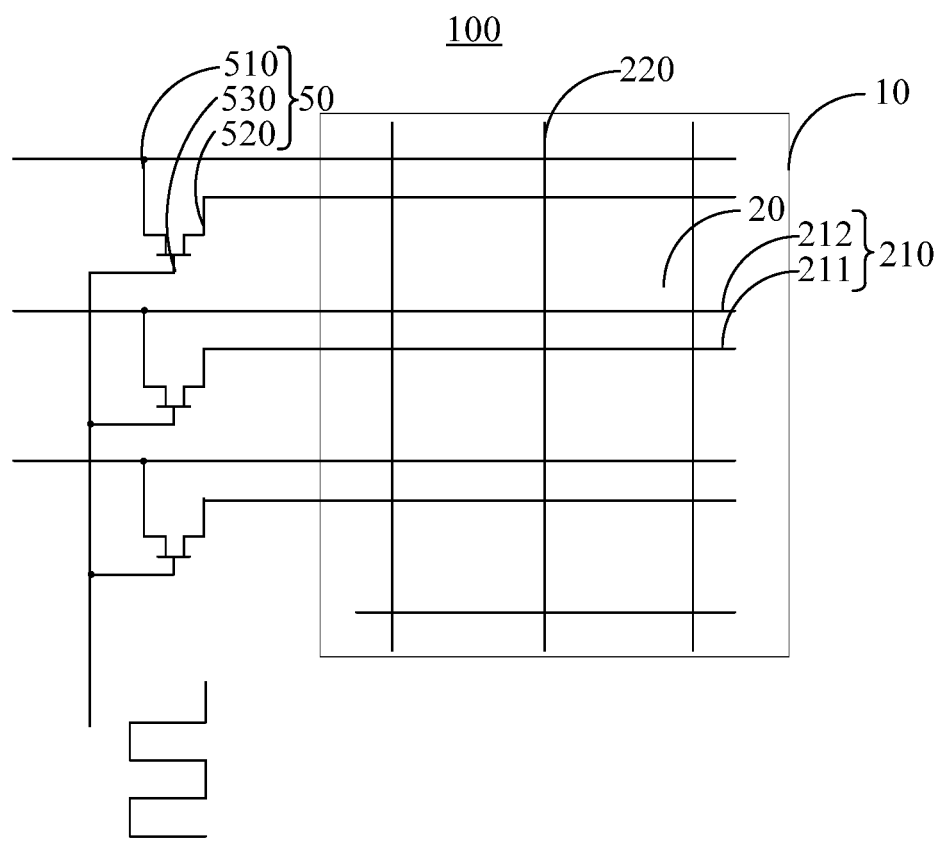
FIG. 1 is a partial schematic diagram of an array substrate according to an embodiment of the present disclosure.

100 Array substrate
10 Substrate
20 Pixel unit
210 Scanning line
211 First scanning line
212 Second scanning line
220 Data line
30 First active switch
310 Control end
320 First connecting end
330 Second connecting end
40 Second active switch
410 Control end
420 First connecting end
430 Second connecting end
50 Control switch
510 First connecting end
520 Second connecting end
530 Control end
610 Timing control circuit
620 Scan drive circuit
630 Data drive circuit
70 Pixel electrode
80 Display panel
90 Backlight module
200 Display device
300 Housing
400 Base
500 Display screen

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are only some embodiments rather than all the embodiments of the present disclosure. All other embodiments obtained by a person of ordinary skill in the art based on the embodiments of the present disclosure without creative efforts shall fall within the protection scope of the present disclosure.

It should be understood that the terms "include" and "comprise", when used in this specification and the appended claims, specify the presence of stated features, integers, steps, operations, elements, and/or components, but do not preclude the presence or addition of one or more other features, integers, steps, operations, elements, components, and/or groups thereof.

It should also be understood that the terminology used herein is for the purpose of describing particular embodiments only and is not intended to be limiting of the present disclosure. As used in this specification and the appended claims of the present disclosure, the singular forms "a", "an" and "the" are intended to include the plural forms as well, unless the context clearly indicates otherwise.

Referring to FIG. 1, which is a partial schematic diagram of an array substrate 100 according to an embodiment of the present disclosure. The array substrate 100 includes a substrate 10. A plurality of pixel units 20 and a plurality of control switches 50 are formed on the substrate 10. The plurality of pixel units 20 is defined by a plurality of scanning lines 210 and a plurality of data lines 220 that are perpendicular to each other, arranged separately, and arranged in a matrix. The plurality of scanning lines 210 includes a plurality of first scanning lines 211 and a plurality of second scanning lines 212. One first scanning line 211 and one second scanning line 212 are corresponding arranged for each row of pixel units 20, one data line 220 is correspondingly arranged for each column of pixel units 20, that is, each of the pixel units 20 is limited in a space enclosed by the corresponding first scanning line 211, the corresponding second scanning line 212, and two neighboring data lines 220. Each of the control switches 50 controls operation of two rows of the pixel units 20, and the control switches 50 are turned on under the action of a low level and turned off under the action of a high level.

The control ends 530 of the plurality of control switches 50 are all configured to connect a timing control circuit 610 that outputs a clock signal, and output clock signals one by one. The second scanning line 212 corresponding to each row of pixel units 20 is connected to a first connecting end 510 of one control switch 50. First connecting ends 510 of the control switches 50 are configured to commonly connect a scan drive circuit 620 controlled by the timing control circuit 610 and input a drive signal. A second connecting end 520 of the control switch 50 is connected to the first scanning line 211 corresponding to a next row of pixel units 20, so as to charge the row of pixel units 20 through the second scanning line 212 in a time period of a clock signal starting from a moment of a rising edge of the clock signal. When the clock signal becomes at a low level, the control switch 50 corresponding to the next row of pixel units 20 is turned on, and the next row of pixel units 20 is pre-charged through the first scanning line 211.

The array substrate 100 is a most important portion of the display panel 80, and the problem about charging the pixel units 20 of the array substrate 100 directly affects the display effects of the whole display panel. In this embodiment of the present disclosure, two scanning lines 210 are corresponding arranged for each row of pixel units 20, that is, the first scanning line 211 and the second scanning line 212. The first scanning lines 211 pre-charge the pixel units 20 and the second scanning lines 212 charge the pixel units 20. The clock signal not only controls output of a drive signal, but also controls ON and OFF of the control switch 50. When a clock signal comes, a drive signal is input to the second scanning line 212 corresponding to one row of pixel units 20, so that the row of pixel units 20 is charged. When the clock signal becomes at a low level and before a next clock signal comes, the control switch 50 that is controlled by a clock signal and connected to the first scanning line 211 corresponding to a next row of pixel units 20 is turned on. The drive signal is input to the first scanning line 211 corresponding to the next row of pixel units 20 through the corresponding control switch 50, so as to pre-charge the next row of pixel units 20, so as to achieve an objective that a next row of pixel units 20 is pre-charged while one row of pixel units 20 is charged. Under the action of the clock signals, drive signals are sequentially input to each of the scanning lines 220 till all the pixel units 20 are charged.

For the array substrate 100 of the present disclosure, the first scanning line 211 and the second scanning line 212 are correspondingly arranged for each row of pixel units 20, the first scanning line 211 pre-charges the pixel units 20, the second scanning line 212 charges the pixel units 20, the first scanning line 211 is connected to a control switch 50 of a previous row of pixel units 20. When a certain row of pixel units 20 is charged for a time period, the clock signal becomes at a low level, the control switch 50 is turned on, the drive signal is input to the second scanning line 212 of a next row of pixel units 20 at the same time, and the next row of pixel units 20 is pre-charged, so as to enhance charging efficiency of the pixel units 20.

Figure 2:
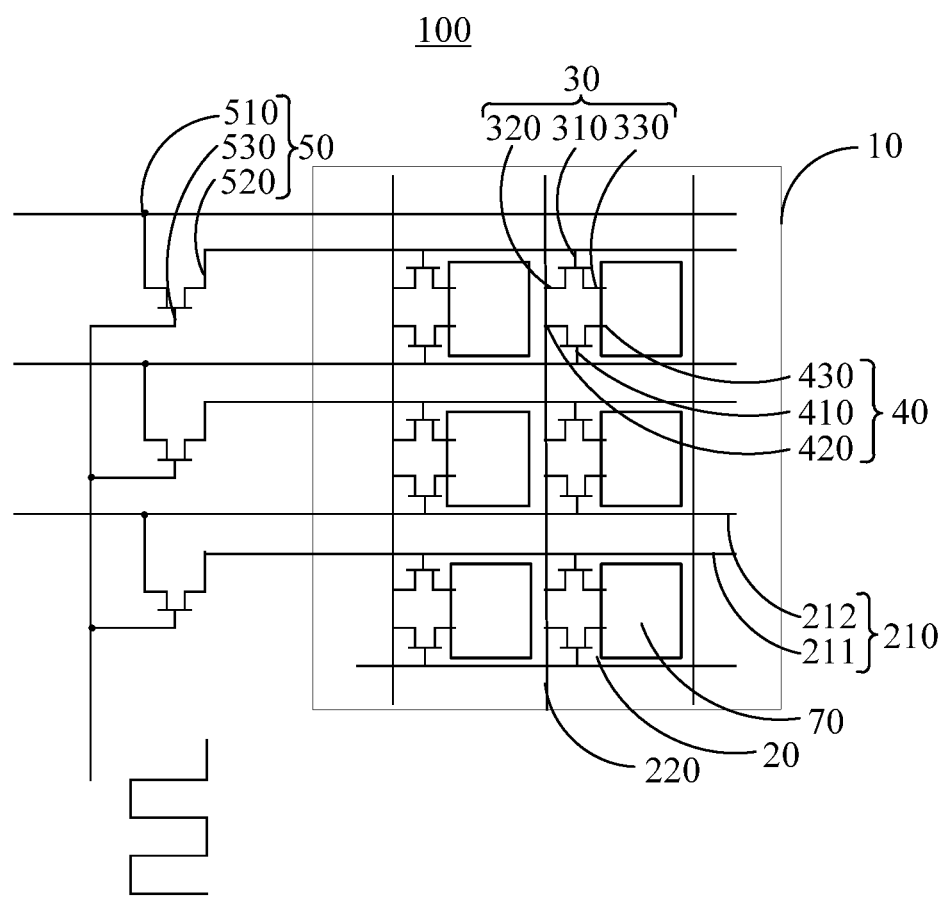
FIG. 2 is a partial schematic diagram of an array substrate according to another embodiment of the present disclosure.

Referring to FIG. 2, which is a partial schematic diagram of an array substrate 100 according to another embodiment of the present disclosure. The array substrate 100 includes a substrate 10. A plurality of pixel units 20, a plurality of first active switches 30, a plurality of second active switches 40, and a plurality of control switches 50 are formed on the substrate 10. The plurality of pixel units 20 is defined by a plurality of scanning lines 210 and a plurality of data lines 220 that are perpendicular to each other, arranged separately, and arranged in a matrix. The plurality of scanning lines 210 includes a plurality of first scanning lines 211 and a plurality of second scanning lines 212. One first scanning line 211 and one second scanning line 212 are correspondingly arranged for each row of pixel units 20. One data line 220 is correspondingly arranged for each column of pixel units 20, that is, each of the pixel units 20 is limited in a space enclosed by the corresponding first scanning line 211, the corresponding second scanning line 212, and two neighboring data lines 220. Each of the control switches 50 controls operation of two rows of the pixel units 20, and the control switches 50 are turned on under the action of a low level and turned off under the action of a high level.

One first active switch 30 corresponds to one pixel unit 20, and each of the pixel units 20 in the second row to the last row corresponds to one second active switch 40. Since a pre-charging process of a first row of pixel units 20 is not the same as a pre-charging process of another row of pixel units 20, the first row of pixel units 20 may not correspond to the second active switch 40. In addition, each pixel unit 20 includes a pixel electrode 70. A control end 310 of each of the first active switches 30 is connected to a corresponding first scanning line 211, a first connecting end 320 of the first active switch 30 is connected to a corresponding data line 220, a second connecting end 330 of the first active switch 30 is connected to a corresponding pixel electrode 70. A control end 410 of each of the second active switches 40 is connected to a corresponding second scanning line 212, a first connecting end 420 of the second active switch 40 is connected to a corresponding data line 220, and a second connecting end 430 of the second active switch 40 is connected to a corresponding pixel electrode 70.

Control ends 530 of the plurality of control switches 50 are all configured to connect a timing control circuit 610 that outputs a clock signal, and output clock signals one by one, the second scanning line 212 corresponding to each row of pixel units 20 is connected to a first connecting end 510 of one control switch 50, first connecting ends 510 of the control switches 50 are configured to commonly connect a scan drive circuit 620 controlled by the timing control circuit 610 and input a drive signal, a second connecting end 520 of the control switch 50 is connected to the first scanning line 211 corresponding to a next row of pixel units 20, so as to charge the row of pixel units 20 through the second scanning line 212 in a time period of a clock signal starting from a moment of a rising edge of the clock signal. When the clock signal becomes at a low level, the control switch 50 corresponding to the next of pixel units 20 is turned on, and the next row of pixel units 20 is pre-charged through the first scanning line 211.

The first active switches 30 are thin film transistors or other triodes, and are not limited hereto. In some embodiments, control ends 310 of the first active switches 30 are gates, first connecting ends 320 of the first active switches 30 are sources, and second connecting ends 330 of the first active switches 30 are drains.

The second active switches 40 are thin film transistors or other triodes, and are not limited herein. In some embodiments, control ends 410 of the second active switches 40 are gates, first connecting ends 420 of the second active switches 40 are sources, and second connecting ends 430 of the second active switches 40 are drains.

The control switches 50 are thin film transistors or other triodes, and are not limited herein. For example, N-channel Metal Oxide Semiconductor (MOS) tube. Control ends 530 of the control switches 50 are gates, first connecting ends 510 of the control switches 50 are sources, and second connecting ends 520 of the control switches 50 are drains.

In an embodiment of the present disclosure, a first scanning line 211 and a second scanning line 212 are correspondingly arranged for one row of pixel units 20, the second scanning lines 212 corresponding to each row of the pixel units 20 are all connected to a corresponding control switch 50. The clock signal not only controls output of a drive signal, but also controls ON and OFF of the control switch 50. When a clock signal comes, a drive signal is input to the second scanning line 212 corresponding to one row of pixel units 20, so as to charge the row of pixel units 20. When the clock signal becomes at a low level and before a next clock signal comes, the control switch 50 that is controlled by a clock signal and connected to the first scanning line 211 corresponding to a next row of pixel units 20 is turned on, the drive signal is input to the first scanning line 211 corresponding to the next row of pixel units 20 through the corresponding control switch 50, so as to pre-charge the next row of pixel units 20, so as to achieve an objective that a next row of pixel units 20 is pre-charged while one row of pixel units 20 is charged. Under the action of the clock signals, drive signals are sequentially input to each of the scanning lines till all the pixel units 20 are charged.

For the array substrate 100 of the present disclosure, a first scanning line 211 and a second scanning line 212 are correspondingly arranged for each row of pixel units 20, the first scanning line 211 pre-charges the pixel units 20, the second scanning line 212 charges the pixel units 20, the first scanning line 211 is connected to a control switch 50 of a previous row of pixel units 20. Under the action of a clock signal, after a certain row of pixel units 20 is charged for a time period, a next row of pixel units 20 is pre-charged, so as to enhance charging efficiency of the pixel units.

Figure 3:
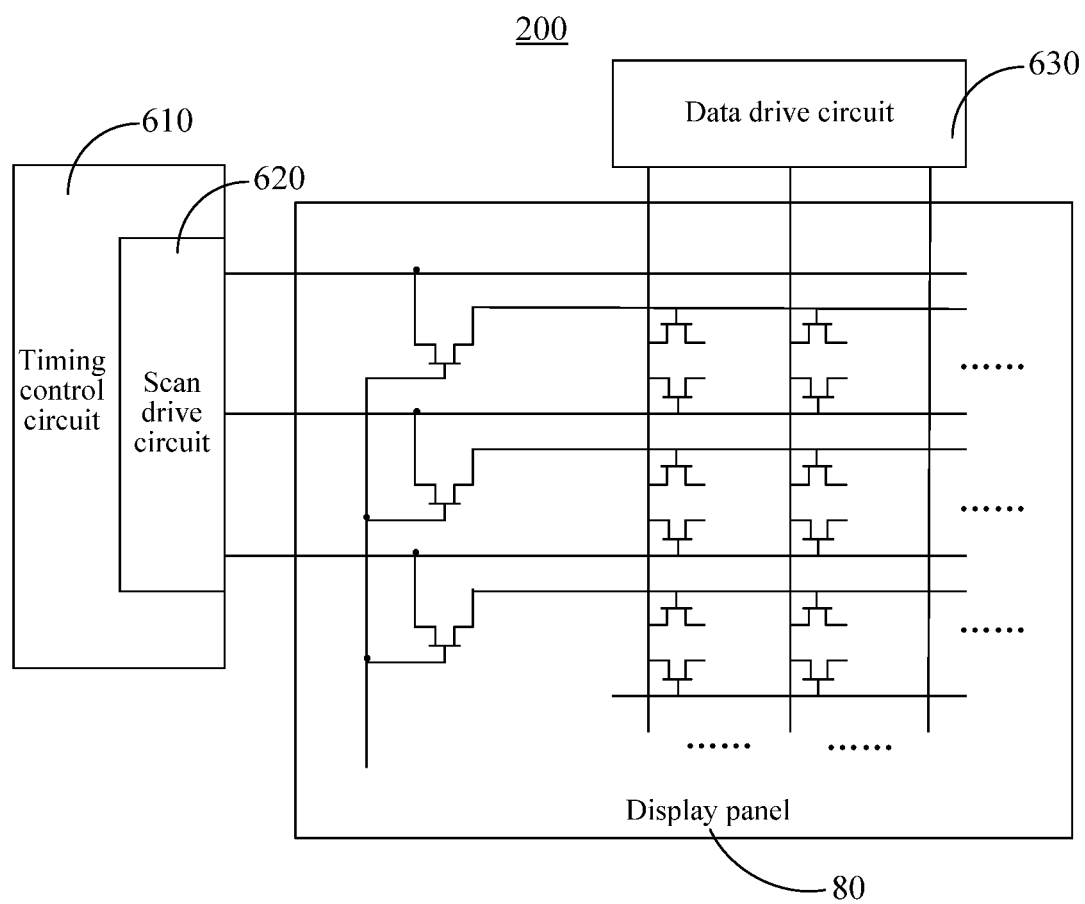
FIG. 3 is a schematic diagram of a display device according to an embodiment of the present disclosure.

FIG. 3 is a schematic structural diagram of a display device 200 according to an embodiment of the present disclosure. The display device 200 includes a display panel 80, a scan drive circuit 620, and a data drive circuit 630, the display panel 80 is configured to display a video signal, the scan drive circuit 620 is configured to drive scanning lines 210 of the display panel 80, and the data drive circuit 630 is configured to drive data lines 220 of the display panel 80.

The display panel 80 includes an array substrate 100, and the structure of the array substrate 100 may be referred to in the foregoing embodiments, and will not be repeated herein.

Figure 4:
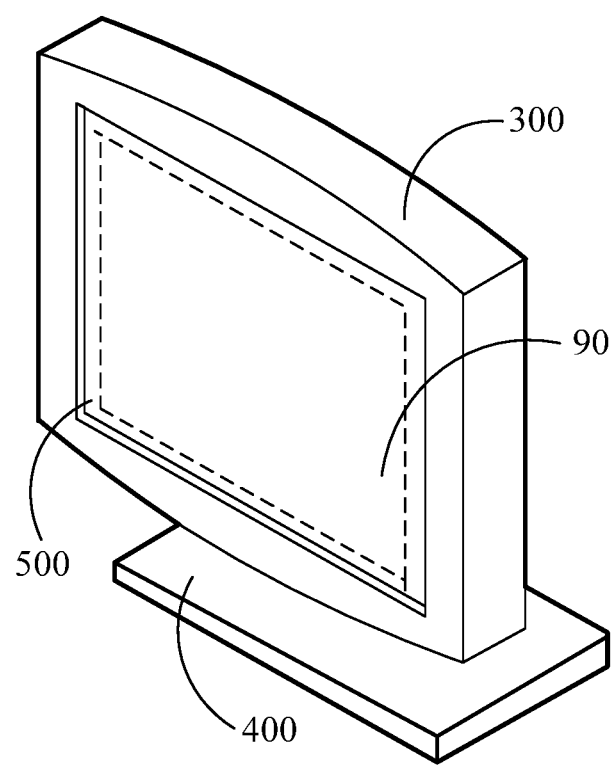
FIG. 4 is a schematic diagram of a display device according to another embodiment of the present disclosure.

FIG. 4 is a schematic diagram of a display device 200 according to another embodiment of the present disclosure. As shown in FIG. 4, the display device 200 includes a display screen 500 and a housing 300 for fixing the display screen 500. The display screen 500 includes a display panel 80, a backlight module 90, a scan drive circuit 620, and a data drive circuit 630. The backlight module 90 is configured to provide a light source for the display panel 80, the scan drive circuit 620 is configured to drive scanning lines 210 of the display 80, the data drive circuit 630 is configured to drive data lines 220 of the display panel 80, and the display panel 80 is configured to display a video signal between the scan drive circuit 620 and the data drive circuit 630.

Furthermore, the display device 200 further includes a base 400 and the base 400 makes the display device 200 be stably placed on a horizontal plane, such as a desktop.

Furthermore, the display panel 80 includes an array substrate 100, and the structure of the array substrate 100 may be referred to in the foregoing embodiments, and will not be repeated herein.

For the display device 200 of the present disclosure, the first scanning line 211 and the second scanning line 212 are correspondingly arranged for each row of pixel units 20 of the display panel 80, the first scanning line 211 pre-charges the pixel units 20, the second scanning line 212 charges the pixel units 20. The first scanning line 211 is connected to a control switch 50 of a previous row of pixel units 20. When a certain row of pixel units 20 is charged for a time period, the clock signal becomes at a low level, the control switch 50 is turned on, the drive signal is input to the second scanning line 212 of a next row of pixel units 20 at the same time, and the next row of pixel units 20 are pre-charged, so as to enhance charging efficiency of the pixel units 20.

It should be noted that in the foregoing embodiments, the description of each embodiment has respective focuses. For a part that is not described in detail in an embodiment, refer to related descriptions in other embodiments.

The foregoing descriptions are merely specific embodiments of the present disclosure, but are not intended to limit the protection scope of the present disclosure. Any modification or replacement readily figured out by persons skilled in the art within the technical scope disclosed in the present disclosure shall fall within the protection scope of the present disclosure. Therefore, the protection scope of the present disclosure shall be subject to the appended claims.

What is claimed is:

1. An array substrate, comprising:
a substrate;
a plurality of pixel units arranged on the substrate, wherein the plurality of pixel units is formed by a plurality of scanning lines and a plurality of data lines perpendicular to each other and is arranged in a matrix, the plurality of scanning lines comprises a plurality of first scanning lines and a plurality of second scanning lines, one first scanning line of the plurality of first scanning lines and one second scanning line of the plurality of second scanning lines are correspondingly arranged for each row of the plurality of pixel units, one data line of the plurality of data lines is arranged for each column of the plurality of pixel units, and each of the plurality of pixel units is located between the corresponding first scanning line and the corresponding second scanning line;
a plurality of first active switches, wherein each of the plurality of first active switches corresponds to one of the plurality of pixel units, a control end of each of the plurality of first active switches is connected to the corresponding first scanning line, and a first connecting end of each of the plurality of first active switches is connected to the corresponding data line;
a plurality of second active switches, wherein each of the plurality of pixel units in the second row to the last row corresponds to one second active switch of the plurality of second active switches, a control end of each of the plurality of second active switches is connected to the corresponding second scanning line, and a first connecting end of each of the plurality of second active switches is connected to the corresponding data line; and
a plurality of control switches, wherein the second scanning line corresponding to each row of the plurality of pixel units is connected to the first connecting end of one of the plurality of control switches, a second connecting end of each of the plurality of control switches is connected to the first scanning line corresponding to a next row of the plurality of pixel units, the first connecting ends of the plurality of control switches are configured to be commonly connected to a scan drive circuit controlled by a timing control circuit, and the control ends of the plurality of control switches are configured to be commonly connected to the timing control circuit that outputs a clock signal.

2. The array substrate according to claim 1, wherein each of the plurality of pixel units comprises one pixel electrode, and a second connecting end of each of the plurality of first active switches is connected to the corresponding pixel electrode, a second connecting end of each of the plurality of second active switches is connected to the corresponding pixel electrode.

3. The array substrate according to claim 2, wherein the plurality of first active switches include thin film transistors, the control ends of the plurality of first active switches include gates, the first connecting ends of the plurality of first active switches include sources, and the second connecting ends of the plurality of first active switches include drains.

4. The array substrate according to claim 2, wherein the plurality of second active switches include thin film transistors, the control ends of the plurality of second active switches include gates, the first connecting ends of the plurality of second active switches include sources, and the second connecting ends of the plurality of second active switches include drains.

5. The array substrate according to claim 1, wherein the plurality of control switches include N-channel thin film transistors, the control ends of the plurality of control switches include gates, the first connecting ends of the plurality of control switches include sources, and the second connecting ends of the plurality of control switches include drains.

6. A display device, comprising:
a display panel;
a scan drive circuit configured to drive first scanning lines and second scanning lines of the display panel;
a data drive circuit configured to drive data lines of the display panel; and
a timing control circuit configured to output a clock signal and control operations of the scan drive circuit and the data drive circuit and on and off of the control switches,
wherein the display panel comprises an array substrate and the array substrate comprises:
a substrate;
a plurality of pixel units arranged on the substrate, wherein the plurality of pixel units is defined by a plurality of scanning lines and a plurality of data lines perpendicular to each other and is arranged in a matrix, the plurality of scanning lines comprises a plurality of first scanning lines and a plurality of second scanning lines, one first scanning line of the plurality of first scanning lines and one second scanning line of the plurality of second scanning lines are correspondingly arranged for each row of the plurality of pixel units, one data line of the plurality of data lines is arranged for each column of the plurality of pixel units, and each of the plurality of pixel units is located between the corresponding first scanning line and the corresponding second scanning line;
a plurality of first active switches, wherein each of the plurality of first active switches corresponds to one pixel unit of the plurality of pixel units, a control end of each of the plurality of first active switches is connected to the corresponding first scanning line, and a first connecting end of each of the plurality of first active switches is connected to the corresponding data line;
a plurality of second active switches, wherein each of the plurality of pixel units in the second row to the last row corresponds to one second active switch of the plurality of second active switches, a control end of each of the plurality of second active switches is connected to the corresponding second scanning line, and a first connecting end of each of the plurality of second active switches is connected to the corresponding data line; and
a plurality of control switches, wherein the second scanning line corresponding to each row of the plurality of pixel units is connected to the first connecting end of one of the plurality of control switches, a second connecting end of each of the plurality of control switches is connected to the first scanning line corresponding to a next row of the plurality of pixel units, the first connecting ends of the plurality of control switches are configured to be commonly connected to the scan drive circuit controlled by the timing control circuit, and the control ends of the plurality of control switches are configured to be commonly connected to the timing control circuit that outputs a clock signal.

7. The display device according to claim 6, wherein each of the plurality of pixel units comprises one pixel electrode, and a second connecting end of each of the plurality of first active switches is connected to the corresponding pixel electrode, a second connecting end of each of the plurality of second active switches is connected to the corresponding pixel electrode.

8. The display device according to claim 7, wherein the plurality of first active switches include thin film transistors, the control ends of the plurality of first active switches include gates, the first connecting ends of the plurality of first active switches include sources, and the second connecting ends of the plurality of first active switches include drains.

9. The display device according to claim 7, wherein the plurality of second active switches include thin film transistors, the control ends of the plurality of second active switches include gates, the first connecting ends of the plurality of second active switches include sources, and the second connecting ends of the plurality of second active switches include drains.

10. The display device according to claim 6, wherein the plurality of control switches include N-channel thin film transistors, the control ends of the plurality of control switches include gates, the first connecting ends of the plurality of control switches include sources, and the second connecting ends of the plurality of control switches include drains.

11. The display device according to claim 6, wherein the plurality of control switches are arranged in a fanout area of the display panel.

12. A display device, comprising:
a display panel;
a scan drive circuit configured to drive first scanning lines and second scanning lines of the display panel;
a data drive circuit configured to drive data lines of the display panel;
a timing control circuit configured to output a clock signal and control operations of the scan drive circuit and the data drive circuit and on and off of the control switches; and
a backlight module configured to provide a light source for the display panel,
wherein the display panel comprises an array substrate and the array substrate comprises:
a substrate;
a plurality of pixel units, arranged on the substrate, wherein the plurality of pixel units is defined by a plurality of scanning lines and a plurality of data lines perpendicular to each other and is arranged in a matrix, the plurality of scanning lines comprises a plurality of first scanning lines and a plurality of second scanning lines, one first scanning line of the plurality of first scanning lines and one second scanning line of the plurality of second scanning lines are correspondingly arranged for each row of the plurality of pixel units, one data line of the plurality of data lines is arranged for each column of the plurality of pixel units, and each of the plurality of pixel units is located between the corresponding first scanning line and the corresponding second scanning line;
a plurality of first active switches, wherein each of the plurality of first active switches corresponds to one pixel unit of the plurality of pixel units, a control end of each of the plurality of first active switches is connected to the corresponding first scanning line, and a first connecting end of each of the plurality of first active switches is connected to the corresponding data line;

a plurality of second active switches, wherein each of the plurality of pixel units in the second row to the last row corresponds to one second active switch of the plurality of second active switches, a control end of each of the plurality of second active switches is connected to the corresponding second scanning line, and a first connecting end of each of the plurality of second active switches is connected to the corresponding data line; and a plurality of control switches, wherein the second scanning line corresponding to each row of the plurality of pixel units is connected to the first connecting end of one of the plurality of control switches, a second connecting end of each of the plurality of control switches is connected to the first scanning line corresponding to a next row of the plurality of pixel units, the first connecting ends of the plurality of control switches are configured to be commonly connected to the scan drive circuit controlled by the timing control circuit, and the control ends of the plurality of control switches are configured to be commonly connected to the timing control circuit that outputs a clock signal.

13. The display device according to claim 12, further comprising a housing configured to package and fix the display panel, the backlight module, the scan drive circuit, and the data drive circuit.

14. The display device according to claim 12, further comprising a base configured to make the display device be stably placed on a horizontal plane.

15. The display device according to claim 12, wherein each of the plurality of pixel units comprises one pixel electrode, and a second connecting end of each of the plurality of first active switches is connected to the corresponding pixel electrode, a second connecting end of each of the plurality of second active switches is connected to the corresponding pixel electrode.

16. The display device according to claim 12, wherein the plurality of first active switches include thin film transistors, the control ends of each of the plurality of first active switches include gates, the first connecting ends of each of the plurality of first active switches include sources, and the second connecting ends of each of the plurality of the first active switches include drains.

17. The display device according to claim 16, wherein the plurality of second active switches include thin film transistors, the control ends of the plurality of second active switches include gates, the first connecting ends of the plurality of second active switches include sources, and the second connecting ends of the plurality of second active switches includes drains.

18. The display device according to claim 12, wherein the plurality of control switches include N-channel thin film transistors, the control ends of the plurality of control switches include gates, the first connecting ends of the plurality of control switches include sources, and the second connecting ends of the plurality of control switches include drains.

19. The display device according to claim 12, wherein the plurality of control switches are arranged in a fanout area of the display panel.

* * * * *